(No Model.)
P. F. BROWN.
ORANGE TREE JACKET.
No. 560,966. Patented May 26, 1896.
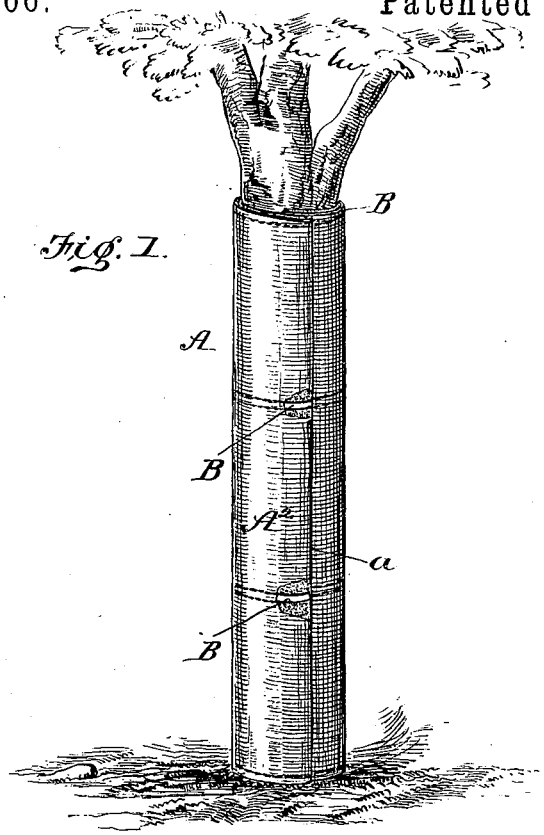
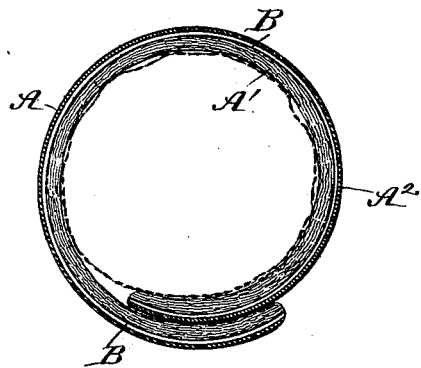
WITNESSES:
Jos. A. Ryan
M. D. Blondel
INVENTOR
Philip F. Brown.
BY Munn & Co.
ATTORNEYS.

UNITED STATES PATENT OFFICE.

PHILIP F. BROWN, OF OCALA, FLORIDA.

ORANGE-TREE JACKET.

SPECIFICATION forming part of Letters Patent No. 560,966, dated May 26, 1896.

Application filed February 18, 1896. Serial No. 579,726. (No model.)

*To all whom it may concern:*

Be it known that I, PHILIP F. BROWN, a citizen of the United States, residing at Ocala, in the county of Marion and State of Florida, have invented certain new and useful Improvements in Orange-Tree Jackets, of which the following is a full, clear, and exact description, reference being had to the accompanying drawings, in which—

Figure 1 shows the jacket in position upon a tree, and Fig. 2 is a horizontal section through the jacket.

My invention relates to an improved jacket for protecting orange-trees against the action of frost and cold.

The invention consists in a tubular longitudinally-split waterproof jacket, formed of an outer and inner fabric, and coil-springs arranged between them for contracting it around the trunk of a tree and allowing it to expand or open when its removal becomes necessary.

A represents my improved tubular jacket or protector formed of an inner layer $A'$ of woolen goods and an outer coating or layer $A^2$ of rubber. This tubular jacket is split longitudinally and is provided with a plurality of coil-springs B, the ends of which register with the longitudinal edges $a$ of the jacket, so that the longitudinal edges of the jacket will be made to overlap and the jacket given the form of a roll or coil. Thus when the longitudinal edges of the jacket are forced apart far enough to permit the jacket to be passed upon the trunk of a tree the springs will exert a contractile force and cause the jacket to snugly embrace the tree. The springs may be secured between the two layers $A'$ $A^2$ or secured to the interior or exterior of the jacket, as may be desired, but in the drawings they are shown between the two layers where they will be protected from the elements.

These jackets may be made of any desired lengths or in different lengths and sizes to suit all sizes of trees, and by keeping a stock of them on hand the orange-grower will be enabled at the approach of severe weather to jacket his grove in a very short time and thus prevent the great loss due to freezing.

The jacket may be utilized in summer or during a long drouth for holding a sponge or cloth for retaining moisture around the body of the tree.

Having thus described my invention, what I claim as new, and desire to secure by Letters Patent, is—

A tree-protector, consisting in a longitudinally-divided, tubular jacket formed of fabric having an outer coating or layer of waterproofing material and a plurality of coil-springs arranged between the two layers and contracting the jacket in the form of a roll, thereby permitting it to be expanded to receive and snugly fit the tree, substantially as set forth.

PHILIP F. BROWN.

Witnesses:
F. D. MASON,
H. G. EAGLETON.